United States Patent [19]
James

[11] Patent Number: 5,628,540
[45] Date of Patent: May 13, 1997

[54] PICKUP TRUCK UTILITY RACK

[76] Inventor: William L. James, 2817 E. 39th, Tulsa, Okla. 74105

[21] Appl. No.: 546,882

[22] Filed: Oct. 23, 1995

[51] Int. Cl.⁶ .................................................. B60D 3/00
[52] U.S. Cl. .................. 296/3; 224/403; 224/402; 280/748; 211/189; 211/191
[58] Field of Search .................. 296/3, 7, 8; 224/553, 224/524, 502, 405, 403, 402; 280/748, 749; 211/180, 189, 190, 191

[56] References Cited

U.S. PATENT DOCUMENTS

| | | | |
|---|---|---|---|
| 3,765,713 | 10/1973 | Suitt | 296/3 |
| 3,891,262 | 6/1975 | Brunel | 296/3 |
| 4,398,763 | 8/1983 | Louw | 296/3 |
| 4,509,787 | 4/1985 | Knaack et al. | 296/3 |
| 5,002,324 | 3/1991 | Griffin | 296/3 |
| 5,108,141 | 4/1992 | Anderson | 296/3 |
| 5,152,570 | 10/1992 | Hood | 296/3 |
| 5,190,337 | 3/1993 | McDaniel | 296/3 |
| 5,476,301 | 12/1995 | Berkich | 224/403 |

*Primary Examiner*—David M. Mitchell
*Assistant Examiner*—Hoa B. Trinh
*Attorney, Agent, or Firm*—Robert K. Rhea

[57] ABSTRACT

A knockdown telescopically expandable elevated utility rack for pickup trucks is formed by forward and rearward H-shaped stanchions and stanchion post receiving brackets overlying pickup bed side walls. A forward stanchion panel and a rearward stanchion bottom rail forms a horizontal load support adjacent the upper limit of pickup bed side walls and a side rail assembly overlying the upper limit of the stanchions and the pickup cab forms an elevated load supporting platform.

9 Claims, 5 Drawing Sheets

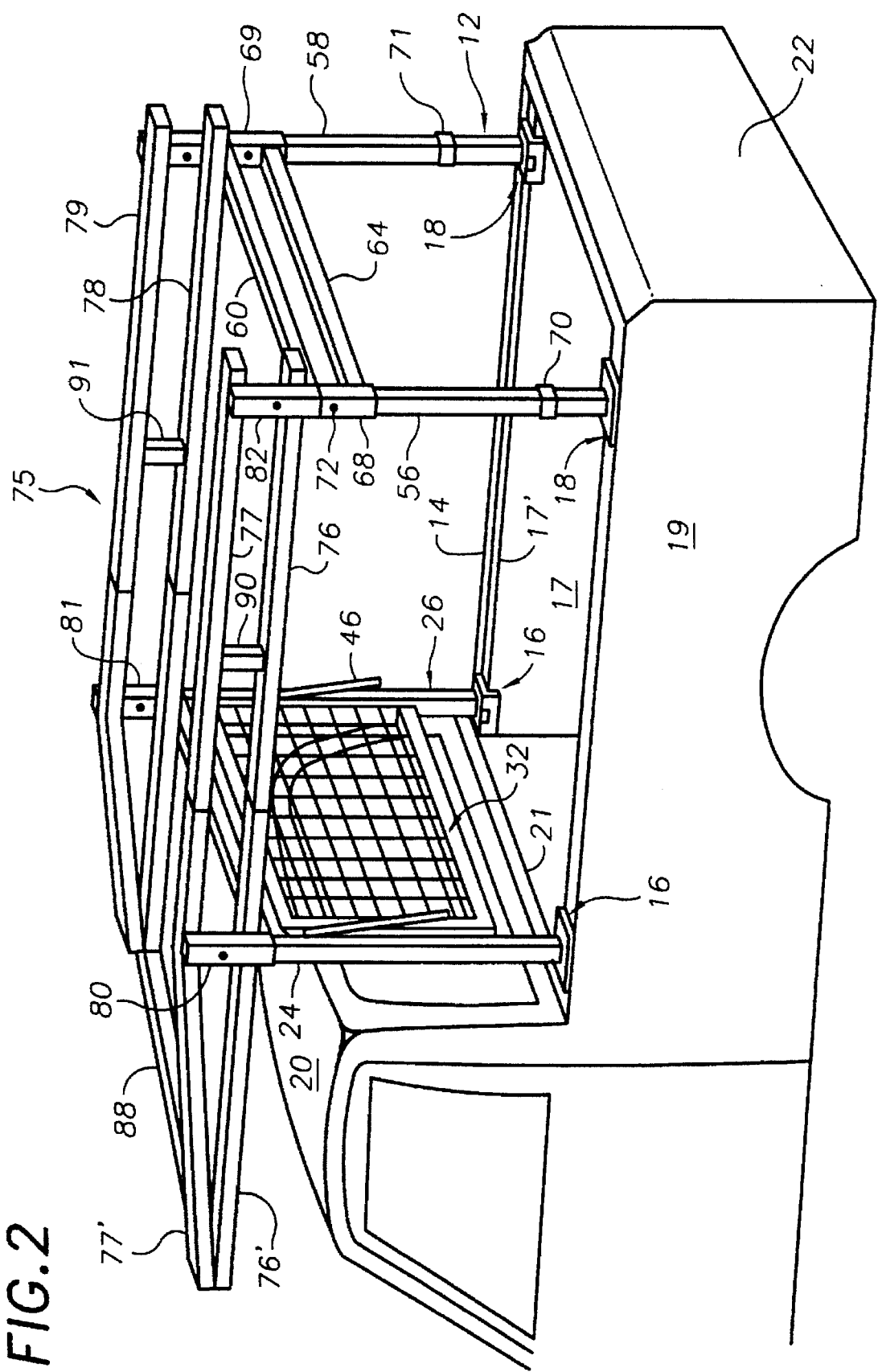

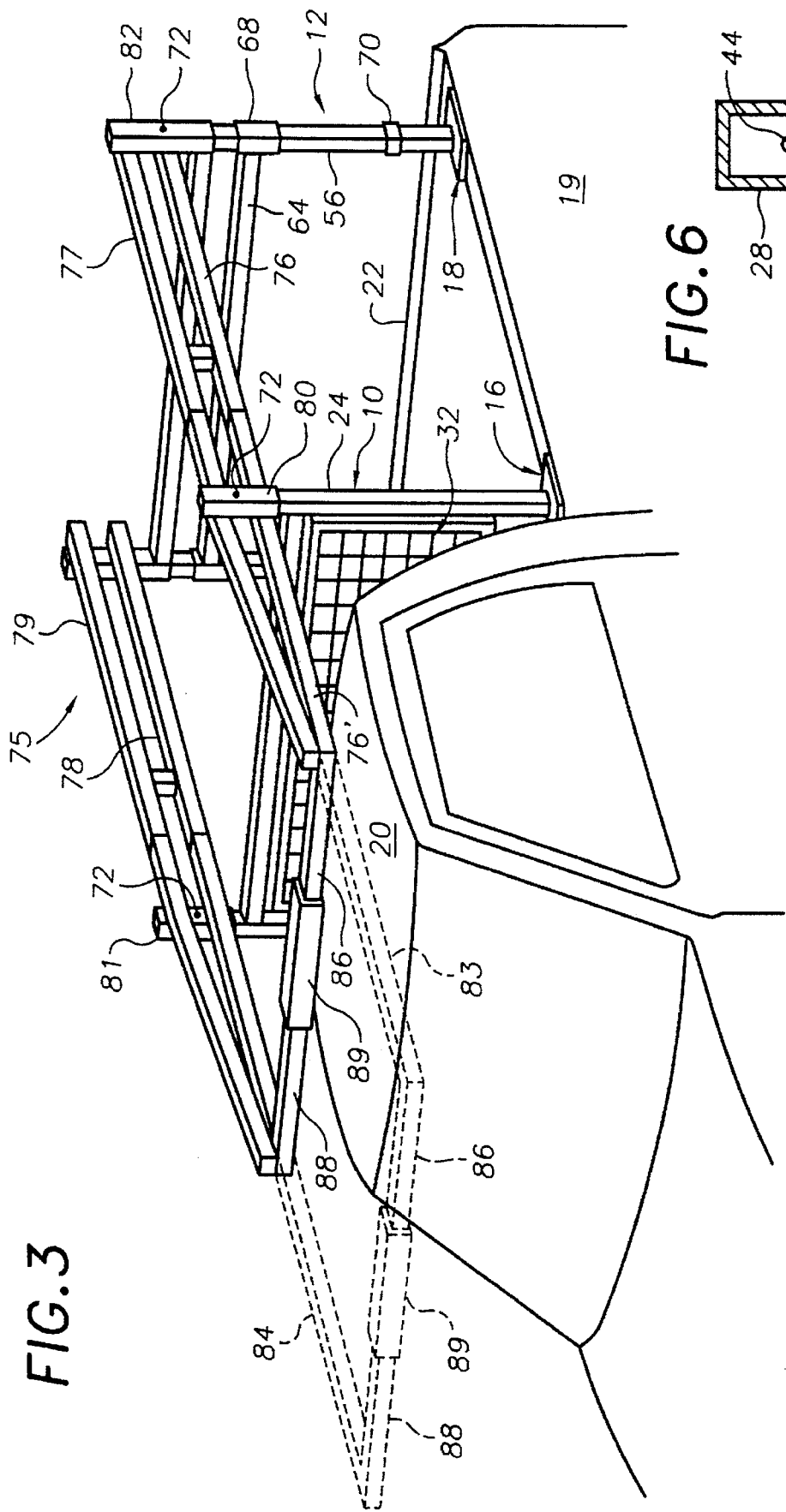
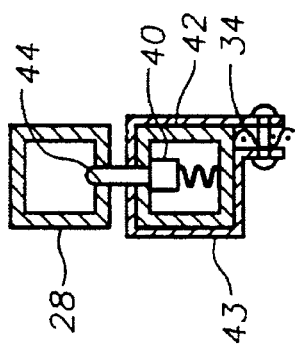

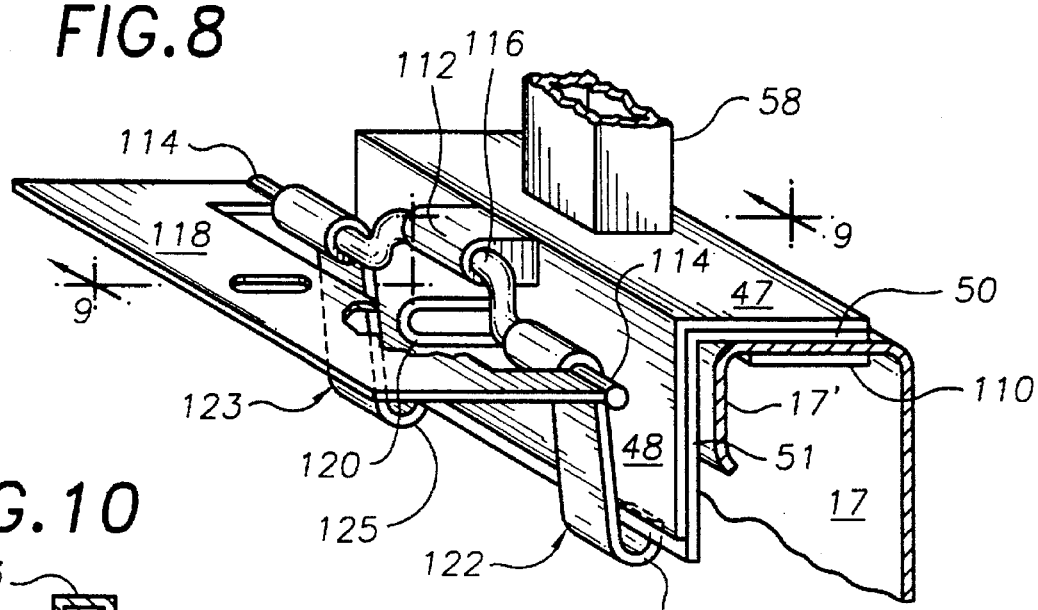
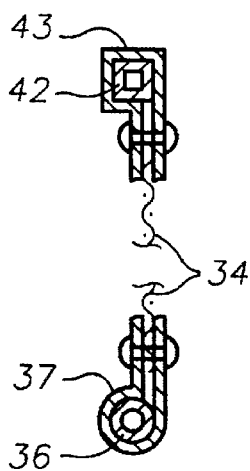
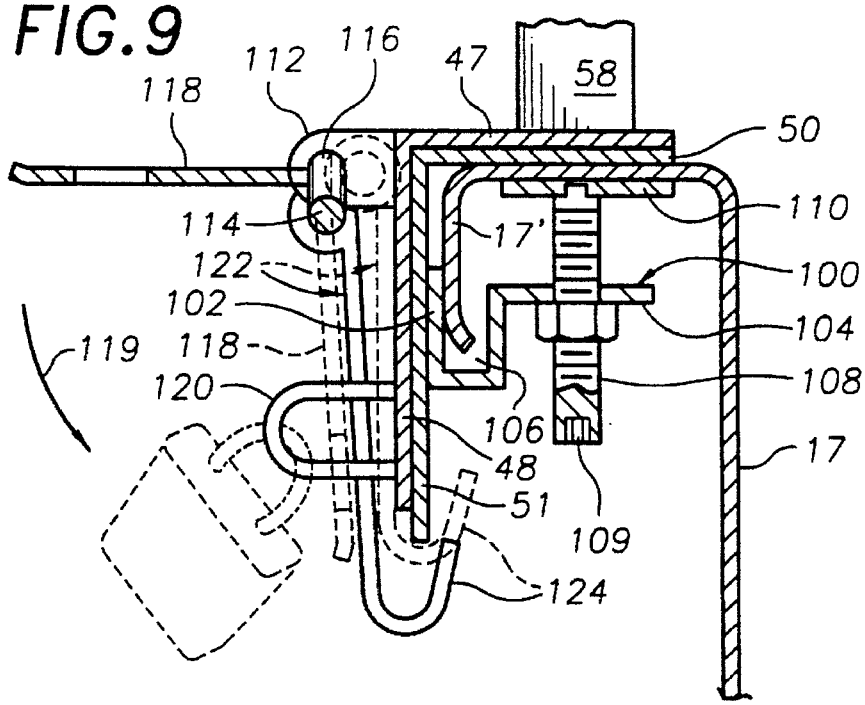

PICKUP TRUCK UTILITY RACK

BACKGROUND OF THE INVENTION

1. Field of the Invention

This invention relates to pickup trucks and more particularly to an adjustable cargo rack for hauling elongated or oversized cargo on small or mid-size pickup trucks.

A pickup truck has a forward cab and a horizontal rearward cargo bed having a forward wall and upstanding side walls, and a rearward tail gate. Wheel wells project into the cargo bed at opposite sides thereof and in small and mid-size pickup trucks the spacing between these wheel wells is insufficient to carry standard size sheet material such as 4 feet wide sheetrock or plywood.

This invention solves this problem by providing an adjustable rack which supports standard size sheet material at dual elevations above the upper limit of the pickup bed side walls.

2. Description of the Prior Art

Several types of framework also called utility racks are presently installed on pickup trucks. Some of these racks are adjustable for carrying various lengths of items such as ladders, pipe, or lumber. Other racks are stationary and permanently attached to the pickup bed which is intended for a particular type of work, but frequently restricts the use of the truck in recreational use or transporting oversize cargo in the bed thereof. The type of utility rack which has an over-the-cab ladder rack all materials must be lifted to a height of approximately 6 feet and are therefore difficult to load and unload. This type of rack also reduces the useable cargo space in the bed.

The most pertinent prior patent known to me is U.S. Pat. No. 5,002,324 issued Mar. 26, 1991 to Griffin for COMPACTABLE UTILITY RACK FOR PICKUP TRUCK. This patent features forward and rearward substantially inverted U-shaped stanchions removably secured to side rails overlying the respective side walls of the pickup bed for adjusting the spacing between the inverted U-shaped stanchions which each have a top or bight portion lying in the horizontal plane of the pickup bed top and therefore necessitate elevating heavy construction materials to a height at least in the elevation of the pickup cab top.

U.S. Pat. No. 3,891,262 issued Jun. 24, 1975 to Brunel for FOLDING CARRIER RACK FOR PICK-UP TRUCKS and U.S. Pat. No. 5,190,337 issued Mar. 2, 1993 to McDaniel for COLLAPSIBLE PIPE RACK FOR PICKUP TRUCKS are believed good examples of the further state-of-the-art. The Brunel patent also features forward and rearward inverted U-shaped stanchions mounted in the bed of a pickup truck at the cab and tailgate end portions in which each stanchion is foldable toward the other to lie flat on the pickup bed when not in use. The McDaniel patent features a rectangular framework having longitudinal lower side rails secured at respective ends with the depending end portion of posts insertable into the side wall pockets of a pickup bed and support a rectangular framework at their upper ends including a U-shaped member extending over a pickup cab and a removable top rear rail. Both of these state-of-the-art patents have the disadvantage all cargo supported thereby is in the plane of the cab top.

This invention, in addition to being adjustable for various sizes of pickup beds of pickup trucks has the added feature of supporting oversize construction material in a plane above the upper limit of the pickup bed and above any conventional tool box, usually carried at the forward end portion of a pickup bed, and which is simple in construction and is easily erected or disassembled.

SUMMARY OF THE INVENTION

A pair of upright H-shaped stanchions are transversely supported at the forward and rearward end portion of a pickup cargo bed by brackets overlying and secured to the side walls of the pickup bed. A panel is hingedly supported by the forward stanchion for vertical pivoting movement about a horizontal axis above the upper limit of a pickup bed tool box and below the bar of the H-shaped stanchion.

The rearward stanchion posts vertically slidably support a horizontal bottom rail, normally disposed adjacent the lower limit of the H-shape bar and at a lower position by stops surrounding the respective post of the H-shaped stanchion in the plane of the forward stanchion panel when hinged to a horizontal position for supporting cargo overlying the forward panel and the rearward moveable cross rail. Vertically spaced parallel side rails respectively secured to vertical tube guides slidably received by the upper end portions of the respective stanchion posts support a horizontally disposed U-shaped extension projecting over the cab of a pickup truck when the side rails are supported by the stanchions.

The principal objects of this invention are: to provide a lock secured collapsible and expandable elevated utility rack for pickup trucks which forms two levels or tiers in vertical spaced relation above the floor of a pickup cargo bed; which features rack stanchions formed by telescoping elements; a top rail assembly telescoping longitudinally of the pickup bed which may be mounted with the stanchions on substantially any pickup truck without modification of the pickup bed; and, which may be easily erected or disassembled.

BRIEF DESCRIPTION OF THE DRAWINGS

FIG. 2 is a view similar to FIG. 1 illustrating utility rack top rails and an over-the-cab forward extension;

FIG. 3 is perspective view, from another view point, illustrating by dotted lines the forward telescoping U-shaped member of the utility rack side rails;

FIG. 6 is a vertical cross sectional view to an enlarged scale taken substantially along the line 6—6 of FIG. 5;

FIG. 8 is a perspective view to a larger scale of one of a lockable stanchion support bracket securing a stanchion post to a pickup bed side wall;

FIG. 9 is a vertical cross sectional view to a larger scale, taken substantially along the line 9—9 of FIG. 8; and, FIG. 10 is a vertical cross sectional view, to a similarly enlarged scale, taken substantially along the line 10—10 of FIG. 5.

DESCRIPTION OF THE PREFERRED EMBODIMENTS

Like characters of reference designate like parts in those figures of the drawings in which they occur.

Figure 1:
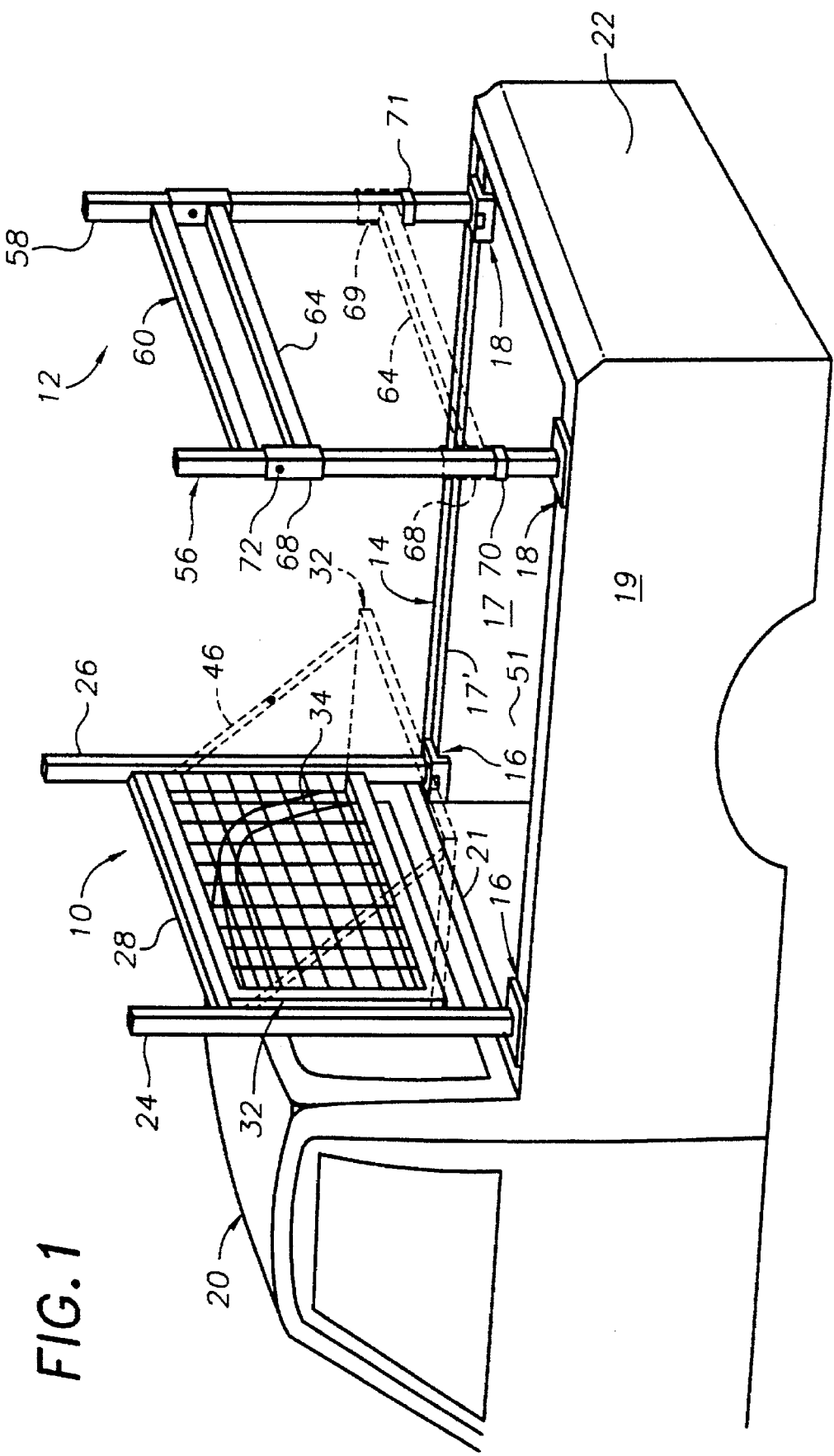
FIG. 1 is a perspective view of utility rack stanchions in operative position on a fragmentary portion of a pickup truck, and illustrating by dotted lines, a lowered position of fore and aft components forming a horizontal plane for supporting construction material.

Referring first to FIG. 1, the reference numerals 10 and 12 respectively indicate a pair of upright H-shaped stanchions supported at the fore and aft limits of a pickup truck bed 14 by pairs of C-clamp bracket means 16 and 18, overlying the cargo bed side walls 17 and 19, with a cab 20 and front wall 21 defining the forward limit of the pickup bed and having a tailgate 22 at its rearward end.

Figure 5:
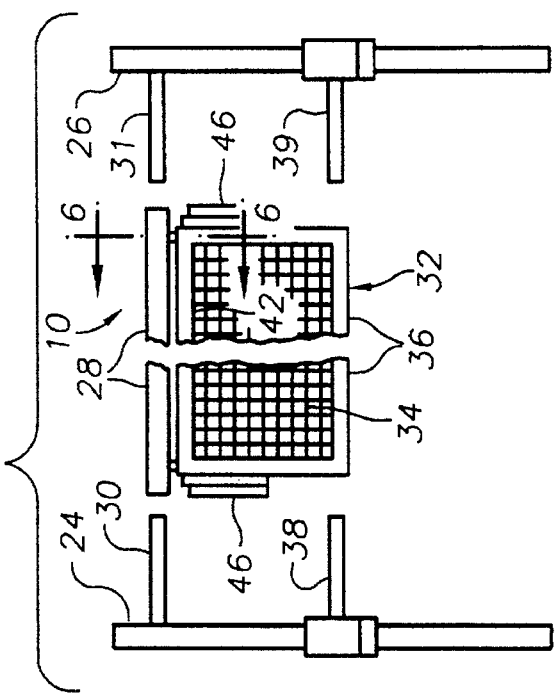
FIG. 5 is an exploded elevational view of the forward utility rack stanchion.

Referring also to FIGS. 5 and 6, the forward stanchion 10 is formed by rectangular tubular material and includes a pair of upright posts 24 and 26 having a top rail 28 extending horizontally therebetween and telescopically receiving, at its respective end portions, a pair of stub bars 30 and 31 each rigidly connected at one end in confronting axial alignment, with the respective post 24 and 26.

The stanchion 10 further includes a panel 32 formed by a rectangular frame having its central portion covered by a screen 34 and having its bottom tubular member 36 similarly telescopically receiving adjacent end portions of hinge shaft tubes 38 and 39, circular in cross section and respectively connected at one end with the posts 24 and 26 in axial confronting relation and spaced downwardly from the top cross rail 28, thus forming a hinge for the panel 32 for vertical pivoting movement about the horizontal axis formed by the hinge shaft tubes 38 and 39.

The screen 34, preferably formed from expanded metal, is attached to the panel top rail 42 and bottom rail 36. Clips 43 and 37 (FIG. 10) surrounding the rails 43 and 36 respectively form a slot-like opening which receives the edge surfaces of the screen 34 in clamping relation.

The panel 32 is normally maintained in the vertical plane formed by the posts 24 and 26 by a spring urged detent 40 (FIG. 6) in its tubular top member 42 entering an aperture or recess 44 in the stanchion top rail 28. The panel 32 may be lowered to a horizontal plane, as illustrated by dotted lines (FIG. 1), and supported by pairs of links 46 at its respective ends pivotly connected with the ends of the panel top tubular member 42 and with the respective post 24 and 26.

As mentioned hereinabove, the depending end portions of the posts 24 and 26 are secured to by the pair of brackets 16. The pair of brackets 16 as well as the pair of brackets 18 are mirror images of each other, and in the interest of brevity only one bracket of the pair of brackets 18 is described in detail.

Referring more particularly to FIGS. 8 and 9, the C-clamp bracket means 18 comprises a length of angle iron having one flange portion 47 secured, as by welding, to the depending end of the post 58 and extending longitudinally and flatly overlying the upper surface of the pickup bed inverted U-shape side wall 17 with its other flange portion 48 flatly disposed adjacent the inward surface of the pickup bed side wall 17'.

A substantially identical angle iron member has one lip portion 50 interposed between the flange portion 47 and the side wall 17 top surface with its other depending lip portion 51 secured to the depending angle iron flange portion 48. The depending longitudinal edge surface of the angle iron lip 51 extends downwardly below the lowermost limit of the angle iron flange portion 48 for the purpose presently explained.

The C-shape is completed by a generally L-shapped member 100 having its foot portion 102 interposed between the angle iron lip portion 51 and the pickup inner side wall member 17' and rigidly secured to the lip portion 51 to form, in combination with its leg portion 104, a recess 106 nesting the depending edge portion of the pickup inner side wall member 17'. A threaded bolt 108 having an ALLEN wrench socket 109 impinges a portion of the pickup bed side wall horizontal upper surface between the angle iron lip portion 50 and a clamp plate 110 coextensive with the length of the lip portion 50. An apertured ear 112, projects horizontally inward from the central upper limit of the angle iron flange portion 48 and journals a central crank 116 of a rod 114 having its end portions normally offset downwardly, as illustrated by solid lines (FIG. 8).

A hasp plate 118 is rigidly connected horizontally to respective end portions of the rod 114 opposite the angle iron flange portion 47 (FIG. 8) for vertical downward pivoting movement substantially 90°, in the direction of the arrow 119, to surround a lock receiving staple 120 mounted on the adjacent surface of the angle iron flange portion 48. A pair of generally J-shaped plates 122 and 123 are pivotly connected with and depend from respective end portions of the rod 114 adjacent the crank 116 for lifting the J-shaped hooks 124 and 125 into engagement with the bottom edge surface of the angle iron lip portion 51 when the hasp plate 118 is pivoted downwardly as illustrated by dotted lines (FIG. 9).

Figure 7:
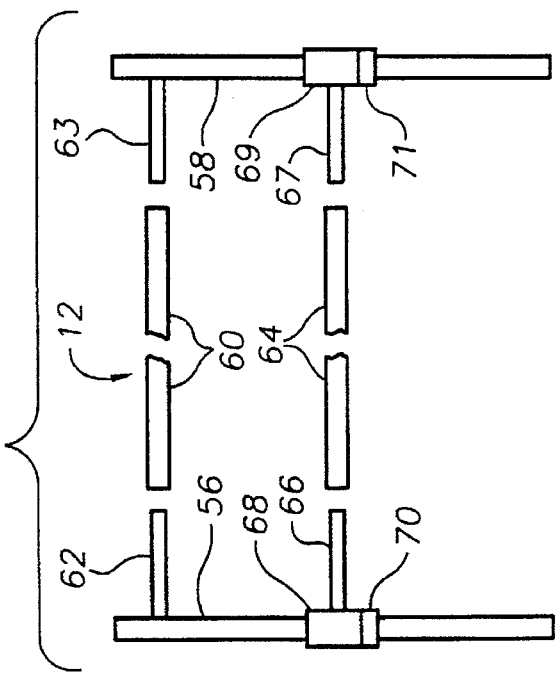
FIG. 7 is a view similar to FIG. 5 illustrating the rearward stanchion of the utility rack.

Referring also to FIG. 7, the rearward stanchion 12 is similarly formed by a pair of upright posts 56 and 58, having a top rail 60 extending therebetween and telescopically receiving at its respective end portions a pair of stub bars 62 and 63 each rigidly connected at one end portion with the respective post 56 and 58 in axial confronting relation. The rearward stanchion 12 further includes a lower or bottom rail 64 similarly telescopically receiving at its respective end portions, stub cross members 66 and 67, each rigidly connected at one end portion with a relatively short length guide tube 68 and 69, respectively, vertically slidably surrounding the respective post 56 and 58. Downward movement of the lower rail 64 is limited by sleeve stops 70 and 71 rigidly secured to the perimeter of the respective post 56 and 58. The vertically moveable lower rail 64 is normally maintained adjacent the top rail 60 by pins 72 (FIG. 1) extending through the respective guide tube 68 and 69 and entering the respective post 56 and 58. The pair of bracket means 18 similarly secure+the rearward stanchion posts 56 and 58 to the pickup sidewalls.

Figure 4:
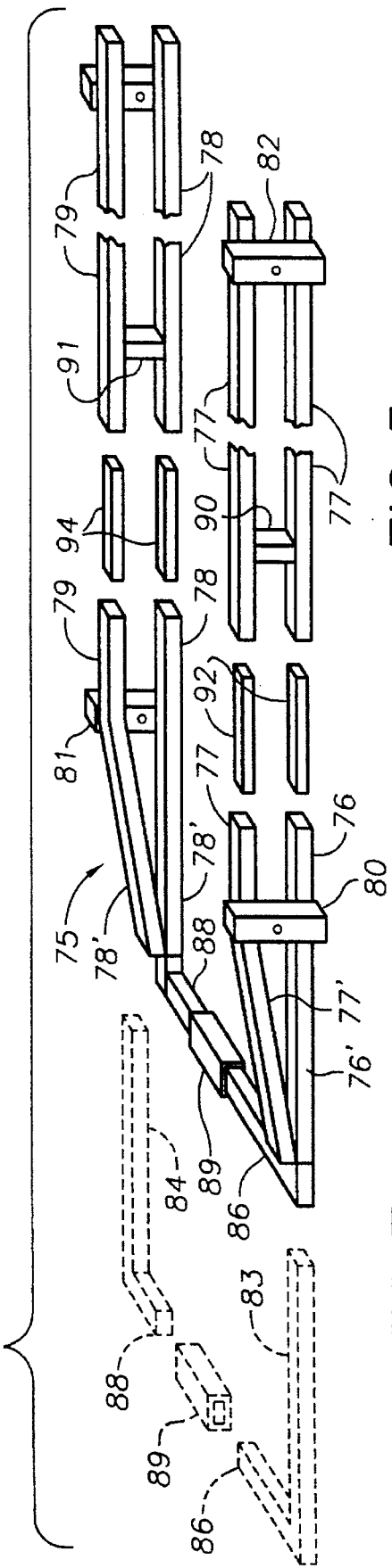
FIG. 4 is an exploded perspective view of the utility rack side rails and forward extension, per se.

Referring also to FIGS. 2, 3, and 4, the reference number 75 indicates a top side rail assembly supported by the upper limit of the fore and aft stanchions 10 and 12 for supporting elongated construction material, not shown, having a length substantially greater than the longitudinal length of the bed of the pickup truck. The rail assembly 75 is formed by elongated vertically spaced parallel pairs of side rails 76–77 and 78–79 disposed at respective sides of the stanchions, and only the pair of side rails 76–77 is described in detail in the interest of brevity. The forward and rearward end portions of the side rails 76 and 77 are rigidly secured to a pair of sleeves 80 and 82 respectively telescopically receiving the upper end portion of the stanchion posts 24 and 56 and anchored by pins 72. The forward end portion 76' of the lower rail 76 projects forwardly substantially coextensive with the pickup cab 20, and with the forwardly extending portion 78' of the lower member 78, of the other pair of side rails 78–79, telescopically receives the leg portions 83 and 84 of a pair of L-shaped members having their foot portions 86 and 88 telescopically joined by an outer tube 89 transversely of the pickup cab and extended forwardly as illustrated by dotted lines (FIG. 3) for supporting construction material, not shown, extending longitudinally of the pickup side rail assembly 75. The forward end portions 77' and 78' of the upper side rails 77 and 78' are angled downwardly and forwardly from the forward side rail assembly sleeves 80 and 81 and joined to the forward end portions 76' and 78' of the lower side rails 76 and 78 to similarly rigidly support material overlying the foot portions 86 and 88 telescopically joined by a tube 89. Both pairs of rails 76–77 and 78–79 are provided, intermediate their ends, with a pair of vertical spacers 90 and 91 and are transversely severed between the respective spacer 90 and 91 and the forward side rail supporting sleeves 80 and 81 for telescopically receiving pairs of expansion tubes 92 and 94 for longitudinal adjustment of the pairs of rails 76–77 and 78–79 in accordance with the longitudinal spacing between the stanchions 10 and 12 and the length of the pickup bed 14.

Obviously the invention is susceptible to changes or alterations without defeating its practicability. Therefore, I do not wish to be confined to the preferred embodiment shown in the drawings and described herein.

I claim:

1. A utility rack for a pickup truck having a cab and a longitudinal rearwardly projecting cargo bed, the cargo bed having longitudinally extending parallel side walls terminating upwardly in an inverted U-shape, a forward wall and a tailgate, said rack comprising:

forward and rearward pairs of clamp bracket means secured in aligned relation transversely of said cargo bed to the forward and rearward end portions, respectively, of said side walls;

forward and rearward upright substantially H-shaped stanchion units including pairs of posts with each pair of posts of said pairs of posts connected by a top rail and connected respectively with the forward and rearward pairs of said clamp bracket means;

panel means hingedly connected between said forward stanchion posts for vertical pivoting movement about a horizontal hinge axis toward and away from the vertical plane formed by said forward stanchion;

strand means connecting said panel with said forward stanchion for limiting movement of said panel from said vertical plane to substantially 90°;

a guide tube vertically slidably surrounding each post of said rearward stanchion pair of posts;

a bottom rail extending between and secured to said guide tubes; and, a stop secured to the periphery of each post of said rearward stanchion pair of posts for limiting downward sliding movement of said bottom rail to the horizontal plane of said panel hinge axis.

2. The utility rack according to claim 1 and further including:

tubular side rail means longitudinally overlying and releasably secured to said forward and rearward stanchions at respective lateral limits thereof and projecting forwardly over said cab; and, a U-shaped cross member extending between and telescopically received by the forward end portions of said tubular rails.

3. The utility rack according to claim 2 in which said top rails and said bottom rail comprises:

a plurality of telescoping members.

4. The utility rack according to claim 1 in which said panel includes:

vertically spaced parallel top and bottom tubular members;

a pair of hinge shaft tubes respectively secured in axially aligned relation to said posts of said pair of forward stanchion posts for telescopically receiving and journalling respective end portions of said panel bottom member; and, a screen extending between and supported by said panel top and bottom members.

5. The utility rack according to claim 4 and further including:

detent means supported by said panel top member for normally maintaining said panel in the vertical plane defined by said forward stanchion; and, link means extending between said panel and said forward stanchion top rail for limiting downward pivoting movement of said panel.

6. The utility rack according to claim 2 in which said tubular side rail means comprises:

two pairs of elongated horizontally disposed telescoping vertically spaced parallel rails;

a sleeve surrounding the upper end portion of the respective stanchion post of said pair of posts of said forward and rearward stanchions and extending vertically between and secured to said tubular side rails at respective end portions thereof.

7. The utility rack according to claim 1 in which the clamp bracket means includes:

C-clamp means secured to each post of said pairs of stanchion posts for gripping an intermediate portion of the respective pickup side wall.

8. The utility rack according to claim 7 in which said C-shaped clamp means comprises:

angle means underlying and secured in orthognal relation to the depending end of the respective post of said pairs of stanchion posts and having inner surfaces longitudially overlying the upper limit and adjacent inner side wall limit of the cargo bed respective side wall;

a substantially L-shaped member having its foot portion secured to the inwardly disposed surface of said angle iron means and having its leg portion horizontally disposed in downward spaced relation with respect to the cargo bed side wall upper limit; and, a C-clamp fastener including a clamp plate supported by said L-shaped leg for impinging an intermediate portion of the cargo bed side wall between said angle iron means and the clamp plate.

9. The utility rack according to claim 8 and further including:

a rod having opposite end portions and a crank medially its ends journalled by said angle iron means;

a J-shaped hook pivotally depending from respective end portions of said rod;

a lock staple projecting laterally from said angle iron means between said J-shaped hooks; and, a hasp plate connected with respective end portions of said rod for angular rotation of said rod substantially 90° about the longtiudinal axis of its end portions and lifting said J-shaped hooks into locking engagement with said angle iron means.

* * * * *